United States Patent
Shen (10) Patent No.: US 11,361,457 B2
(45) Date of Patent: Jun. 14, 2022

(54) ANNOTATION CROSS-LABELING FOR AUTONOMOUS CONTROL SYSTEMS

(71) Applicant: Tesla, Inc., Austin, TX (US)

(72) Inventor: Anting Shen, Berkeley, CA (US)

(73) Assignee: Tesla, Inc., Austin, TX (US)

( * ) Notice: Subject to any disclaimer, the term of this patent is extended or adjusted under 35 U.S.C. 154(b) by 72 days.

(21) Appl. No.: 16/514,721

(22) Filed: Jul. 17, 2019

(65) Prior Publication Data

US 2020/0027229 A1    Jan. 23, 2020

Related U.S. Application Data (60) Provisional application No. 62/701,441, filed on Jul. 20, 2018.

(51) Int. Cl.
| | |
|---|---|
| *G06T 7/521* | (2017.01) |
| *G01S 17/89* | (2020.01) |
| *G06V 10/75* | (2022.01) |
| *G06V 20/10* | (2022.01) |

(52) U.S. Cl.
CPC ............. *G06T 7/521* (2017.01); *G01S 17/89* (2013.01); *G06V 10/757* (2022.01); *G06V 20/10* (2022.01)

(58) Field of Classification Search
CPC .. G06T 7/521; G06K 9/00664; G06K 9/6211; G06K 9/6262; G06K 9/00791; G01S 17/89; G01S 17/931; G01S 17/86
USPC ......................................................... 382/154
See application file for complete search history.

(56) References Cited

U.S. PATENT DOCUMENTS

| | | | |
|---|---|---|---|
| 2007/0031064 A1* | 2/2007 | Zhao | G06T 7/33 382/285 |
| 2008/0225048 A1* | 9/2008 | Bijankumar | G06T 15/40 345/421 |
| 2008/0247635 A1* | 10/2008 | Davis | G06T 19/00 382/152 |
| 2012/0128205 A1* | 5/2012 | Lee | G06K 9/00791 382/103 |
| 2018/0129919 A1* | 5/2018 | Tang | G06K 9/6263 |

FOREIGN PATENT DOCUMENTS

WO    WO-2017095580 A1 *    6/2017    ........... G05D 1/0011

* cited by examiner

*Primary Examiner* — Amandeep Saini
(74) *Attorney, Agent, or Firm* — Knobbe, Martens, Olson & Bear, LLP (57) ABSTRACT

An annotation system uses annotations for a first set of sensor measurements from a first sensor to identify annotations for a second set of sensor measurements from a second sensor. The annotation system identifies reference annotations in the first set of sensor measurements that indicates a location of a characteristic object in the two-dimensional space. The annotation system determines a spatial region in the three-dimensional space of the second set of sensor measurements that corresponds to a portion of the scene represented in the annotation of the first set of sensor measurements. The annotation system determines annotations within the spatial region of the second set of sensor measurements that indicates a location of the characteristic object in the three-dimensional space.

20 Claims, 4 Drawing Sheets

ANNOTATION CROSS-LABELING FOR AUTONOMOUS CONTROL SYSTEMS

CROSS-REFERENCE TO RELATED APPLICATIONS

This application claims the benefit of U.S. Provisional Application No. 62/701,441, filed Jul. 20, 2018, which is incorporated herein in its entirety.

BACKGROUND

This invention relates generally to autonomous control systems, and more particularly to training computer models for autonomous control systems.

Autonomous control systems are systems that guide vehicles (e.g., automobiles, trucks, vans) without direct guidance by human operators. Autonomous control systems analyze the surrounding physical environment in various ways to guide vehicles in a safe manner. For example, an autonomous control system may detect and/or track objects in the physical environment, and responsive to a detected object, guide the vehicle away from the object such that collision with the object can be avoided. As another example, an autonomous control system may detect boundaries of lanes on the road such that the vehicle can be guided within the appropriate lane with the flow of traffic. Typically, the autonomous control system includes sensors that capture the surrounding environment as a set of sensor measurements in the form of images, videos, point cloud data, and the like.

Often times, autonomous control systems use computer models to analyze the surrounding environment and perform detection and control operations. The computer models are trained using training data that resemble potential environments the autonomous control system would encounter during operation. The training data may correspond to the type of sensor data generated by the sensors of the autonomous control system. In preparation for the training process, portions of the training data are annotated to label various objects of interest. Computer models can learn representations of the objects through these annotations. For example, annotations for an image of a street from a camera may be regions of the image containing pedestrians that computer models can be trained on to learn representations of people on the street.

Typically, annotations for training data can be generated by human operators who manually label the regions of interest, or can also be generated by annotation models that allow human operators to simply verify the annotations and relabel only those that are inaccurate. While fairly accurate labels can be easily and conveniently generated for certain types of sensor measurements, other types of sensor measurements can be difficult to annotate due to the format, size, or complexity of the data. For example, light detection and ranging (LIDAR) sensors generate sensor measurements in three-dimensional (3D) space that can be difficult for human operators to label compared to a two-dimensional (2D) image. In addition, although annotation models can be used to generate the annotations, this can also be difficult due to the significant amount of data that needs to be processed and the missing sensor measurements that result from the particular sensing mechanism.

SUMMARY

An annotation system uses annotations for a first set of sensor measurements from a first sensor to identify annotations for a second set of sensor measurements from a second sensor. Annotations for the first set of sensor measurements may be generated relatively easily and conveniently, while annotations for the second set of sensor measurements may be more difficult to generate than the first set of sensor measurements due to the sensing characteristics of the second sensor. In one embodiment, the first set of sensor measurements are from a camera that represent a scene in a two-dimensional (2D) space, and the second set of sensor measurements are from an active sensor, such as a light detection and ranging (LIDAR) sensor, that represent the scene in a three-dimensional space (3D).

Specifically, the annotation system identifies reference annotations in the first set of sensor measurements that indicates a location of a characteristic object in the 2D space. The annotation system determines a spatial region in the 3D space of the second set of sensor measurements that corresponds to a portion of the scene represented in the annotation of the first set of sensor measurements. The spatial region is determined using at least a viewpoint of the first sensor and the location of the first annotation in the 2D space. In one embodiment, the spatial region is represented as a viewing frustum, which is a pyramid of vision containing the region of space that may appear in the reference annotation in the 2D image. In one instance, the spatial region may be shaped as a rectangular pyramid.

The annotation system determines annotations within the spatial region of the second set of sensor measurements that indicates a location of the characteristic object in the 3D space. In one embodiment, the annotation system filters the spatial region from the second set of sensor measurements, and applies an annotation model to only the filtered region to determine the annotation for the second set of sensor measurements. The annotation system provides the annotations to human operators, such that they can be verified and relabeled if needed.

By using the annotation for the first set of sensor measurements to help determine the annotation for the second set of sensor measurements, the annotation system can narrow down on a spatial region that contains the characteristic object in the second set of sensor measurements in an efficient manner. For example, when the annotation model is applied to the entire second set of sensor measurements, an incorrect annotation outside the spatial region can potentially be assigned the highest likelihood that the region encompassed by the annotation contains the characteristic object. Since the annotation model is restricted to searching a smaller space that actually contains the characteristic object, there is a higher chance the annotation model will identify the appropriate annotation for the object without the need to search the entire space of the second set of sensor measurements. This way, the annotation system can improve the accuracy of annotations as well as save computational resources compared to applying the annotation model to the entire second set of sensor measurements.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
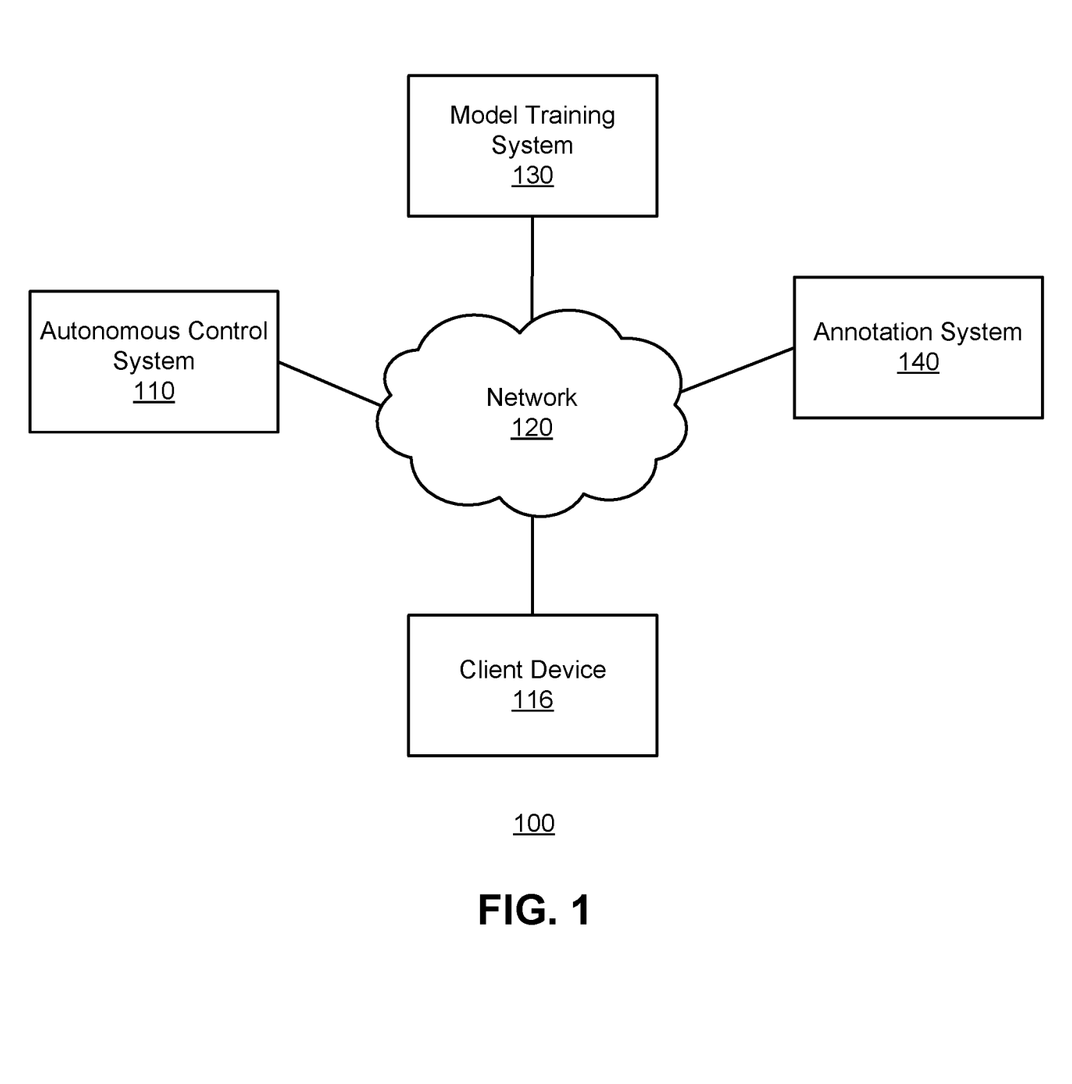
FIG. 1 is an example network environment for an annotation system, according to an embodiment.

FIG. 1 is an example network environment 100 for an annotation system 140, according to an embodiment. The network environment 100 includes an autonomous control system 110, a model training system 130, an annotation system 140, and one or more client devices 116 coupled to a network 120.

The autonomous control system 110 guides vehicles based on information related to the surrounding environment received from the one or more sensors attached to the vehicles. The vehicles are any means of conveyance or transport in or by which someone or something can travel from one place to another, and may include automobiles, trucks, vans, robotic transports, and the like. The autonomous control system 110 may guide a vehicle through one or more trips from one destination to another. For example, the autonomous control system 110 may guide a ride-sharing vehicle (e.g., a taxi) from a passenger's point of pick-up to their desired destination.

The autonomous control system 110 performs various detection and control algorithms based on sensor data to guide the vehicles in a safe and efficient manner. For example, the autonomous control system 110 may detect various objects (e.g., lamp post, cars) that are proximate to a vehicle in the captured sensor data of the environment, and guide the vehicle away from the objects to prevent collision of the vehicle with the objects. As another example, the autonomous control system 110 may detect boundaries of lanes on the road such that the vehicle can be guided within the appropriate lane with the flow of traffic. Other examples also include simulating sensor data, estimating sensor quality, and the like.

One or more sensors are attached to the vehicles to gather information used to generate the control of the vehicle. The sensors are devices that detect information related to the environment, and generate sensor measurements that characterize how the sensor perceives the environment. The information can be captured through many forms.

More generally, the autonomous control system 110 may include passive sensors or active sensors. Passive sensors include a receiver that detects and measures various forms of energy that are naturally emitted from the physical environment or constituents of the physical environment across various locations. In one instance, the passive sensors include a camera that generates a two-dimensional (2D) image of pixel data indicating intensities of detected light as sensor measurements. In another instance, the passive sensors include a microphone that generates a time series of air pressure values. In another instance, the passive sensors include a vibration sensor that generates a time series of physical displacements of the vibration sensor.

Active sensors emit some energy and measure the energy that is reflected back to one or more receivers of the sensor. The reflected energy allows active sensors to probe for environmental information that may not otherwise be readily detected passively at the sensor. This may allow active sensors to represent the environment across a higher dimension compared to passive sensors. For example, active sensors may be capable of estimating distances of objects, and may represent the environment in a three-dimensional (3D) space rather than the 2D space of an image from a camera. Due to their sensing mechanism, active sensors may also output sparse sensor measurements that contain missing portions of data when, for example, objects are outside the sensing range of the sensor or in the presence of occlusions such as rain, fog, and snow.

In one instance, the active sensors include ultrasound sensors that emit ultrasound waves, radio detection and ranging (RADAR) sensors that emit microwaves, light detection and ranging (LIDAR) sensors that emit laser pulses in the near-IR or visible range waves, and IR sensors that emit IR waves. In particular, the sensor measurements of active sensors may include intensity and reflectance measurements of the reflected energy sensed at the receiver. The sensor measurements can be used to generate a depth map indicating how far away objects are from the sensor, or generate a point cloud that represents the environment with reference to a 3D coordinate system, such as a Cartesian coordinate system or a spherical coordinate system. Each value in the point cloud designates the measurements of the actively-transmitted signal as received back at the receiver (e.g., depth or reflected intensity measurements).

In one embodiment, various functions of the autonomous control system 110 are performed through machine-learned computer models. The computer models may be configured to receive the sensor measurements and generate desired output data that is of interest to the autonomous control system 110. For example, a computer detection model may identify regions of a 3D LIDAR point cloud that contains pedestrians, vehicles, and other objects of interest, such that the vehicle can be guided away from these objects to prevent collision. In one embodiment, the machine-learned models are neural network models such as feed-forward networks, convolutional neural networks (CNN), deep neural networks (DNN), recurrent neural networks (RNN), self-organizing maps (SOM), and the like, that are trained by the model training system 130 based on training data.

Though described herein as an autonomous vehicle, the control decisions of the autonomous control system 110 may provide semi-autonomous control rather than complete control of the vehicle, for example to supplement or override user control, or as primary means of control that can be overridden by a user. In addition, although the autonomous control system 110 is described herein as a system that guides vehicles, the autonomous control system 110 may also guide other systems such as robotic arms or manufacturing equipment.

The model training system 130 trains machine-learned computer models for use in the autonomous control system 110. The computer models are trained using training data, which are known sensor measurements that resemble sensing of potential environments the autonomous control system 110 would encounter during operation. The training data may correspond to the type of sensor measurements generated by sensors of the autonomous control system 110. For example, the training data may include images from cameras that represent various scenes in 2D space, and point cloud measurements from active sensors such as LIDAR sensors, RADAR sensors, and the like that represent the scenes in 3D space.

In one embodiment, portions of the training data are annotated by the annotation system 140 with labels indicating various objects of interest, such as pedestrians, vehicles, and the like. The computer models can learn to detect the objects through these annotations. For example, annotations for a training data set of LIDAR sensor measurements may include 3D bounding boxes around vehicles that can be used to train computer models to predict bounding boxes containing the characteristic objects for a new set of LIDAR sensor measurements. The model training system 130 receives annotated training data from the annotation system 140.

The annotation system 140 provides annotated training data to the model training system 130. The annotations represent a desired type of metadata that correspond to the type of data the computer models are configured to predict. For example, annotated regions containing pedestrians can be used to train a computer model that outputs likelihoods that a region of an image contains a pedestrian. In one instance, the annotations are in the form of bounding boxes that enclose objects of interest, preferably within the smallest area or volume possible. In another instance, the annotations are in the form of labels that partition an image into different segments. A pixel or groups of pixels in the image may be assigned a label such that pixels with the same labels share certain characteristics.

In one instance, the annotation system 140 obtains annotations in conjunction with human operators who manually label regions of interest through, for example, an interface provided by the annotation system 140. In another instance, the annotation system 140 automatically generates estimated annotations by applying an annotation model to the training data. Typically, the annotation model scans portions of the sensor measurements in an incremental fashion, and assigns likelihoods to a set of estimated annotations that indicate likelihoods of containing the object of interest. For example, the annotation model may sequentially scan portions of sensor measurements defined by a rectangular bounding box across a particular direction (e.g., width) of the sensor measurements, and assign a likelihood to each portion that indicate a likelihood the portion contains the object of interest. The estimations with the highest likelihoods are usually designated as the annotations for the training data. For example, the bounding boxes with likelihoods above a threshold amount may be designated as annotations for the training data. The annotation system 140 provides the annotations to human operators that verify the result and relabel those that are inaccurate.

While fairly accurate labels can be easily and conveniently generated for certain types of sensor measurements, other types of sensor measurements can be difficult to annotate due to the format, size, or complexity of the data. For example, high-quality annotations for a 2D camera image may be generated fairly easily using widely established annotation tools and models, while sensor measurements for active sensors, such as LIDAR sensors, may require annotations in the 3D space that can be more difficult for human operators to label. Although annotation models can also be used to generate the annotations, this may require scanning the entire set of sensor measurements in the 3D space that can be computationally burdensome. In addition, the annotations may have suboptimal accuracy due to the missing data points that result from the active sensing mechanism.

Thus, in one embodiment, the annotation system 140 uses annotations for a first set of sensor measurements from a first sensor to identify annotations for a second set of sensor measurements from a second sensor. Often times, the training data contains multiple sensor measurements that correspond to the same scene. For example, the training data may have been obtained from multiple sensors attached to a data collection vehicle. The data collection sensors may have the same or different viewpoints. The annotation system 140 takes advantage of the annotations for a first set of sensor measurements to determine annotations for a second set of sensor measurements that capture the same scene. Annotations for the first set of sensor measurements may be generated relatively easily and conveniently, while annotations for the second set of sensor measurements may be more difficult to generate than the first set of sensor measurements due to the sensing characteristics of the second sensor.

Specifically, the annotation system 140 identifies reference annotations in the first set of sensor measurements that indicates a location of a characteristic object in the 2D space. The annotation system 140 determines a spatial region in the 3D space of the second set of sensor measurements that corresponds to a portion of the scene represented in the annotation of the first set of sensor measurements. The spatial region is determined using at least a viewpoint of the first sensor and the location of the annotation in the first set of sensor measurements. In one embodiment, the spatial region is represented as a viewing frustum, which is a pyramid of vision containing the region of space that may appear in the reference annotation in the 2D image. In one instance, the frustum may be shaped as a rectangular pyramid.

The annotation system 140 determines annotations within the spatial region of the second set of sensor measurements that indicates a location of the characteristic object in the 3D space. In one embodiment, the annotation system 140 filters the spatial region from the second set of sensor measurements, and applies an annotation model to only the filtered region to determine the annotations for the second set of sensor measurements. The annotation system 140 provides the annotations to client devices 116 associated with human operators, such that the annotations can be verified and relabeled if needed.

By using the annotation for the first set of sensor measurements to help determine the annotation for the second set of sensor measurements, the annotation system 140 can quickly narrow down on a spatial region that contains the characteristic object. For example, when the annotation model is applied to the entire second set of sensor measurements, an incorrect annotation outside the spatial region can potentially be assigned the highest likelihood, and thus, be designated as an annotation even though the region may not contain the characteristic object. Since the annotation model is restricted to searching a smaller space that contains the characteristic object, there is a higher chance the annotation model will identify the appropriate annotation for the object. This way, the annotation system 140 can improve the accuracy of annotations as well as save computational resources compared to applying the annotation model to the entire second set of sensor measurements.

In one particular embodiment referred to throughout the remainder of the specification, the first set of sensor measurements are sensor measurements from a camera that represent a scene as a two-dimensional (2D) image, and the second set of sensor measurements are sensor measurements from a LIDAR sensor that represent the scene in a three-dimensional space (3D). However, it is appreciated that in other embodiments, the first set of sensors and the second set of sensors can be any other type of sensor measurements that capture the same scene, in which the portion of the scene labeled in the annotation of the first set of sensor measurements can be extrapolated to a region of space in the second set of sensor measurements that contain the portion of the scene.

Figure 2:
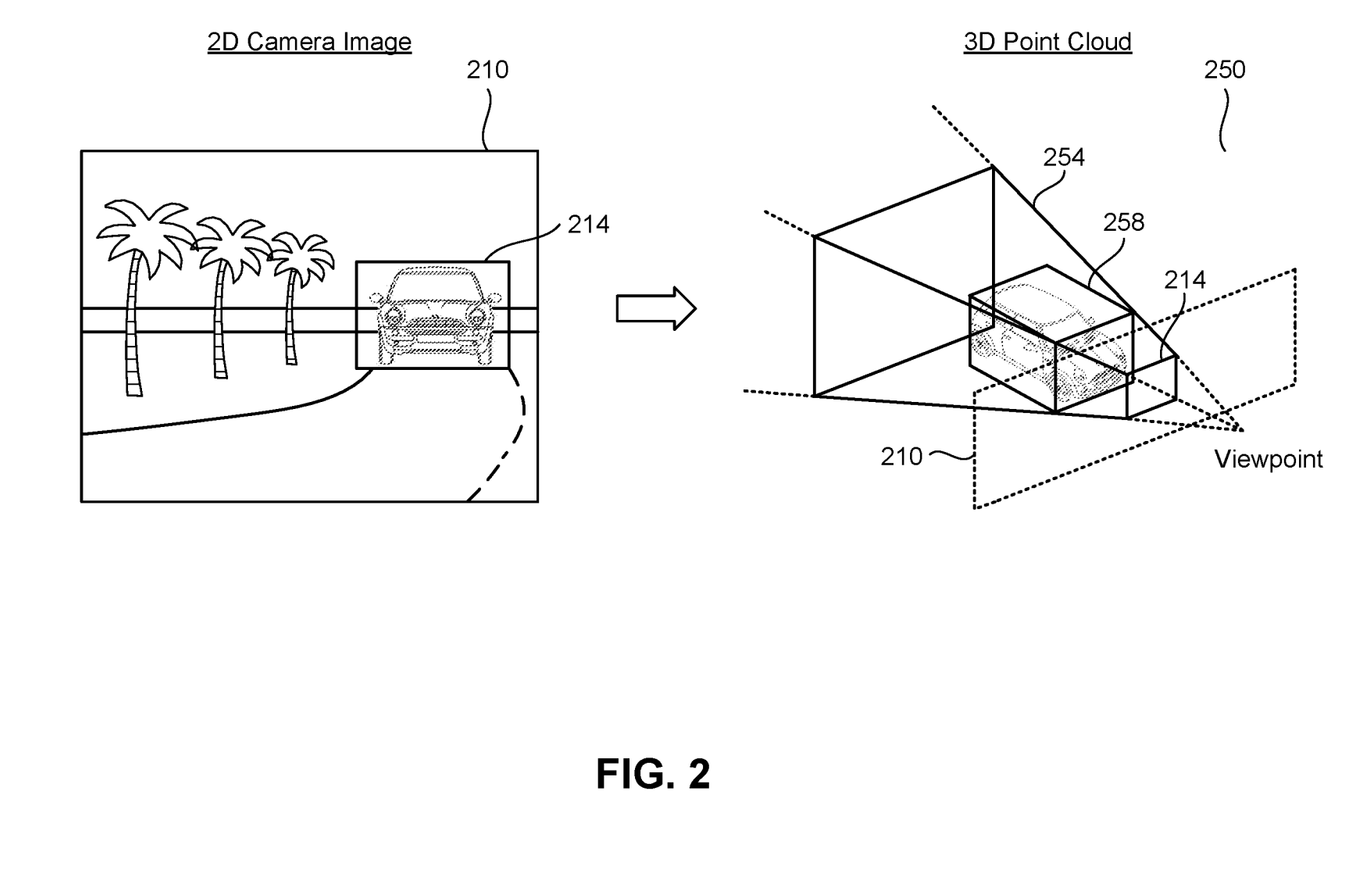
FIG. 2 illustrates an example process of using an annotation for a first set of sensor measurements to identify a 3D spatial region and an annotation for a second set of sensor measurements, according to an embodiment.

FIG. 2 illustrates an example process of using an annotation for a first set of sensor measurements to identify a 3D spatial region and an annotation for a second set of sensor measurements, according to an embodiment. The example shown in FIG. 2 illustrates a 2D camera image 210 of a vehicle on a road, and a 3D LIDAR point cloud 250 of the scene. Specifically, the image 210 is a projection of the scene from a particular viewpoint of the camera. The annotation system 140 obtains a bounding box 214 around the vehicle of interest. The bounding box 214 may be manually drawn by a human operator or identified through an annotation model. The annotation system 140 identifies a frustum 254 shaped as a rectangular pyramid in the 3D LIDAR point cloud 250 that corresponds to a portion of the scene contained in the bounding box 214. The annotation system 140 applies an annotation model to the sensor measurements of the frustum 254 to identify a 3D bounding box 258 around the vehicle of interest.

Although FIG. 2 shows bounding boxes as annotations for ease of illustration, it is appreciated that other types of annotations can be used as described in conjunction with FIG. 1. For example, the annotations for the first and second set of sensor measurements may be segmentation labels indicating pedestrians. As another example, the annotations between the first and second set of sensor measurements may also correspond to different types of labels. For example, the annotations for the first set of sensor measurements may be segmentation labels, while the annotations for the second set of sensor measurements may be 3D bounding boxes.

Returning to FIG. 1, the client device 116 is a computing device capable of receiving user input as well as communicating via the network 120. While a single client device 116 is illustrated in FIG. 1, in practice many client devices 116 may communicate with the systems in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120. In one embodiment, a client device 116 executes an application allowing a user of the client device 116 to interact with the annotation system 140. For example, a client device 116 executes a browser application to enable interaction between the client device 116 and the annotation system 140 via the network 120. In another embodiment, the client device 116 interacts with the annotation system 140 through an application programming interface (API) running on a native operating system of the client device 116, such as IOS® or ANDROID™.

The client devices 116 are associated with human operators that provide various forms of guidance to the annotation system 140 annotations for training data. In one embodiment, the human operators interact with interfaces generated by the annotation system 140 via the client devices 116 to provide guidance on annotations. For example, a human operator may interact with the interface using a browser application of the client device 116. In one embodiment, the client devices 116 receive annotations generated by the annotation system 140 and verifies the accuracy of the annotations. If the annotations are inaccurate, the human operators may also choose to manually relabel the annotations through the interface, such that the annotation system 140 can receive the corrected annotation.

The client devices 116 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Figure 3:
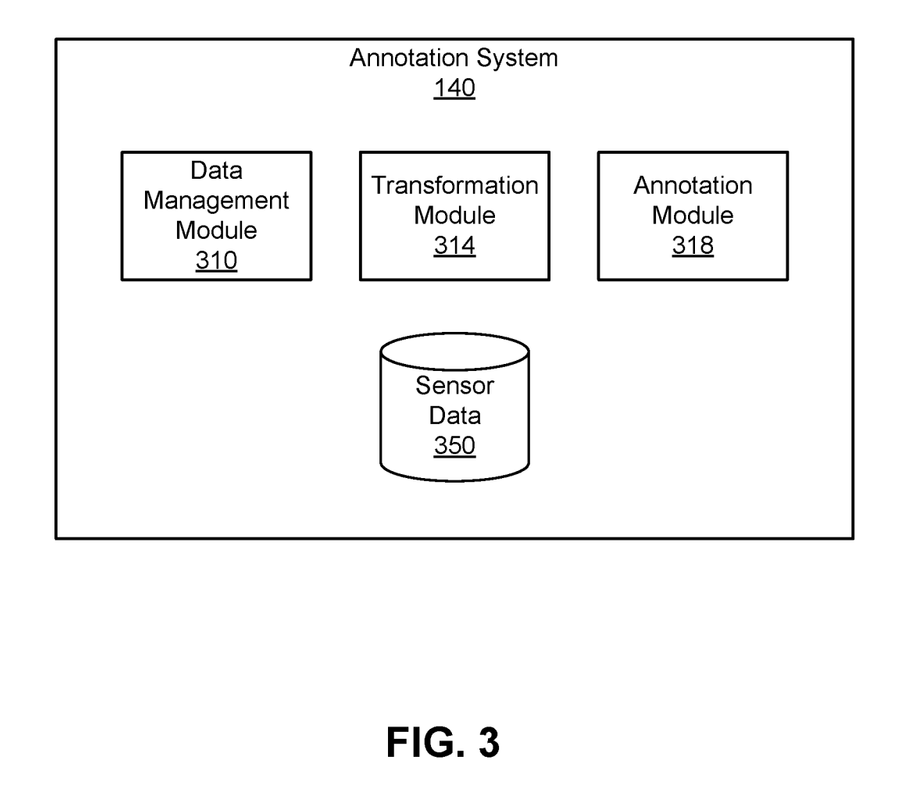
FIG. 3 is an example block diagram of an architecture of the annotation system, in accordance with an embodiment.

FIG. 3 is an example block diagram of an architecture of the annotation system 140, according to one embodiment. The annotation system 140 shown in FIG. 3 includes a data management module 310, a transformation module 314, and an annotation module 318. The annotation system 140 also includes a sensor data store 350. In alternative configurations, different or additional components may be included in the annotation system 140.

The data management module 310 manages the sensor data store 350. The sensor data store 350 includes sensor measurements in the form of images, videos, point clouds, and the like that the annotation system 140 can annotate. The annotated data can be provided to the model training system 130 as training data for training the computer models. The sensor measurements may be generated from physical sensors, may be simulated with respect to virtual sensors or may be a combination of both. In particular, the sensor data store 350 may include sensor measurements from different sensors that correspond to the same scene from the same or different viewpoints.

In one instance, the sensor data store 350 includes sensor measurements from a camera. The sensor measurements from the camera may be arranged as pixels and each pixel may have one or more intensity values associated with it depending on whether the camera is a grayscale or color camera. For example, when the camera is a color camera describing a color of a pixel in red, green, and blue, the intensity value for each is typically an integer, such as an 8, 10, or 12-bit integer specifying the intensity of the red, green, or blue portion of the frequency. If the resolution of the picture were 100×100 pixels (having 10,000 total pixels), for every image, there would be 3 separate channels of 10,000 pixels.

In one instance, the sensor data store 350 includes sensor measurements from an active sensor. The sensor measurements from the active sensor may represent the scene in 3D space. In particular, the sensor data store 350 may include sensor measurements from a LIDAR sensor. The active sensor measurements may sense a same scene captured by the camera images but from a same or different viewpoint from the camera. For example, the training data may include an image of a vehicle on a road captured by a color camera near the dashboard of a vehicle. The training data may also include a LIDAR point cloud of the vehicle on the road captured by a LIDAR sensor attached to the roof of the vehicle.

In one instance, the active sensor measurements are arranged as depth maps. The depth maps include depth measurements that indicate how far away an object in the environment is from the sensor. Specifically, the depth is measured by triggering a timer when the energy is emitted, and detecting the amount of time needed for the receiver to detect the reflected energy. The traveling speed of the energy can be used to calculate the depth of various objects at various locations in the environment by emitting energy signals in the direction of the objects. The depth maps may also include intensity measurements that indicate the intensity of the reflected energy detected at the receiver of the sensor. These intensity values may be represented as 8 or 16-bit integer values.

In another instance, the active sensor measurements are arranged as point clouds with reference to a 3D coordinate system, such as a Cartesian coordinate system or a spherical coordinate system. Each value in the point cloud designates the measurements of the actively-transmitted signal at the receiver (e.g., depth or reflected intensity measurements). The number of data points in the point cloud is related to the resolution of the sensor. Further, for a given sensor, the number of data points varies depending on factors such as what portion of the environment is within the sensor's range.

The transformation module 314 obtains reference annotations in a first set of sensor measurements and identifies a spatial region in a second set of sensor measurements that corresponds to a portion of the scene represented in the reference annotation. As discussed in conjunction with FIG. 1, the first set of sensor measurements may be generated by a camera and the second set of sensor measurements may be generated by a LIDAR sensor. In one embodiment, the transformation module 314 determines the reference annotation for the first set of sensor measurements by applying an annotation model to the data or in conjunction with a human operator who manually labels the data. In other embodiments, the first set of sensor measurements may already be labeled with the appropriate annotations.

The transformation module 314 determines a spatial region in the space of the second set of sensor measurements that corresponds to a portion of the scene captured in the reference annotations of the first set of sensor measurements. When the reference annotation is a bounding box, the portion of the scene may refer to the region contained within the bounding box. When the reference annotations are segmentation labels, the portion of the scene may refer to the region encompassed by the pixels labeled as the characteristic object. The transformation module 314 applies one or more geometric transformations to the annotated region of the first set of sensor measurements to determine the spatial region in the second set of measurements. In particular, when the spatial region is shaped as a viewing frustum, the transformation module 314 may determine the coordinates of the near plane and the far plane of the viewing frustum that contain the characteristic object in the second set of sensor measurements.

The annotation module 318 determines the annotations for the second set of sensor measurements based on the spatial region identified by the transformation module 314. In one embodiment, the annotation module 318 filters the subset of sensor measurements contained in the spatial region and applies an annotation model to only the filtered subset to determine the annotations. In one instance, the annotations output by the annotation model may be 3D bounding boxes that are volumetric rectangular prisms that surround the object of interest in the 3D space. In another instance, the annotations may be segmentation labels that indicate which measurements correspond to characteristic objects.

Figure 4:
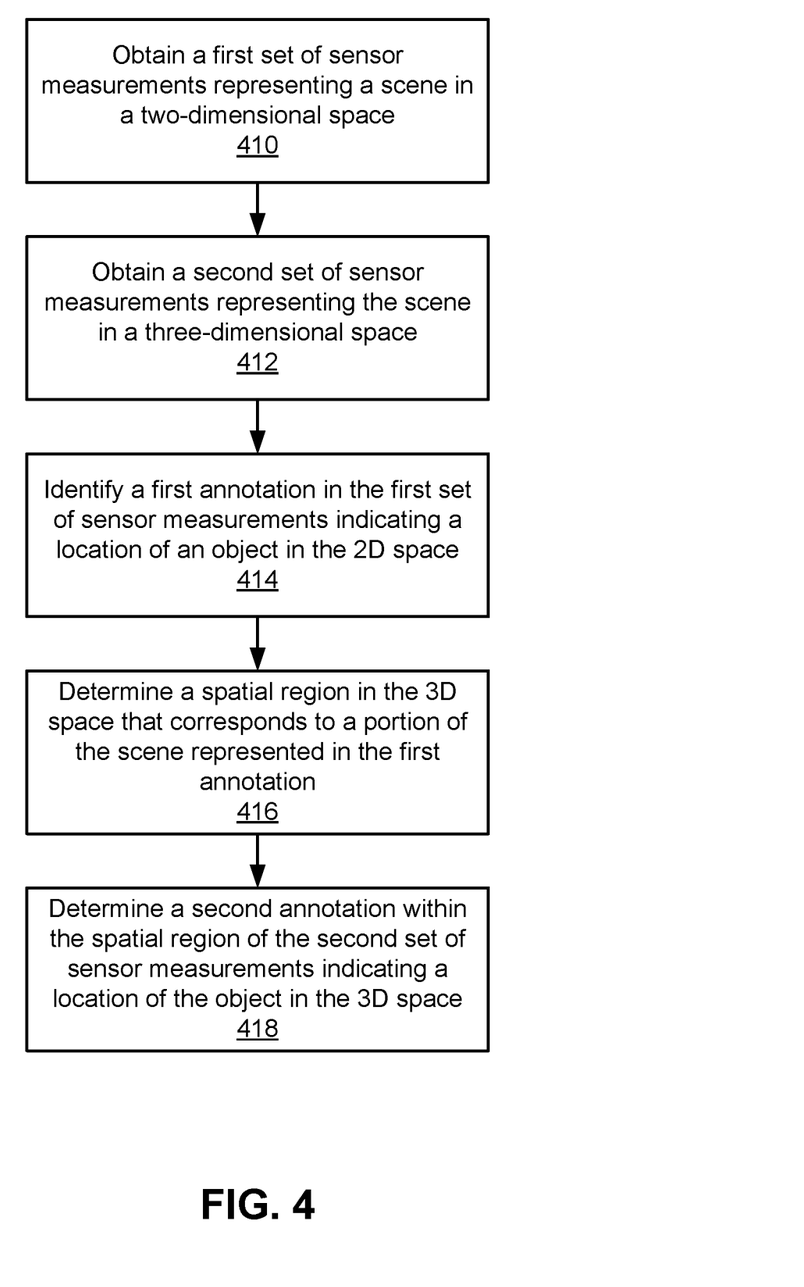
FIG. 4 is a flowchart illustrating a process of determining an annotation for a second set of sensor measurements using an annotation from a first set of sensor measurements, according to one embodiment.

FIG. 4 is a flowchart illustrating a process of determining an annotation for a second set of sensor measurements using an annotation from a first set of sensor measurements, according to one embodiment. The annotation system obtains 410 a first set of sensor measurements representing a scene in a two-dimensional space with respect to a viewpoint of a first sensor capturing the scene. The annotation system obtains 412 a second set of sensor measurements representing the scene in a three-dimensional space captured by a second sensor. The annotation system identifies 414 a first annotation in the first set of sensor measurements that indicates a location of a characteristic object in the two-dimensional space. The annotation system determines 416 a spatial region in the three-dimensional space that corresponds to a portion of the scene represented in the first annotation. The spatial region is determined using at least the viewpoint of the first sensor and a location of the first annotation in the two-dimensional space. The annotation system determines 418 a second annotation within the spatial region of the second set of sensor measurements that indicates a location of the characteristic object in the three-dimensional space. The annotations for the second set of sensor measurements may be used to train a model for detecting characteristic objects in measurements generated by the type of sensor used to generate the second set of sensor measurements.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
   obtaining, by a processor, an image of a real-world scene with respect to a first viewpoint of a first sensor capturing the scene, wherein the first sensor is a camera;
   obtaining, by the processor, a set of sensor measurements representing the scene in a three-dimensional space captured by a second sensor, wherein the second sensor is an active sensor which emits sound and/or light;
   identifying, by the processor, a first annotation in the image that indicates a location of a characteristic object in two-dimensional space of the image, wherein the first annotation is a first bounding box about the characteristic object and represents a portion of the image which depicts the characteristic object;
   determining, by the processor, a spatial region in the three-dimensional space that corresponds to the portion of the scene, wherein the spatial region is determined using at least the first viewpoint of the first sensor and a location of the first annotation in the two-dimensional space,
   and wherein the spatial region represents a frustum which extends in the three-dimensional space from a viewpoint of the first sensor through boundaries of the first bounding box, and wherein the frustum represents a subset of the three-dimensional space; and
   annotating, by the processor, the set of sensor measurements within the spatial region to generate a second annotation that identifies a second bounding box associated with a location of the characteristic object in the three-dimensional space, wherein the second bounding box is identified via searching within the subset of three-dimensional space, and wherein searching of the three-dimensional space is constrained to the subset.

2. The method of claim 1, wherein the set of sensor measurements are arranged as a point cloud that models the scene with respect to a three-dimensional coordinate system.

3. The method of claim 1, wherein the set of sensor measurements are arranged as a depth map, the depth map including depth measurements that indicate distances of objects in the scene from the first sensor.

4. The method of claim 1, wherein determining the second annotation comprises:
   applying an annotation model to the filtered subset to determine the second annotation.

5. The method of claim 1, further comprising training a computer model using the second annotation in the set of sensor measurements.

6. The method of claim 1, wherein the second sensor is a LIDAR sensor.

7. The method of claim 1, wherein the set of sensor measurements are captured with respect to a second viewpoint of the second sensor, and wherein the first viewpoint is different from the second viewpoint.

8. The method of claim 1, wherein the second bounding box surrounds at least a portion of the characteristic object in the three-dimensional space.

9. The method of claim 1, wherein the first sensor and the second sensor were affixed to a data collection vehicle.

10. The method of claim 1, wherein the frustum extends between two planes in the three-dimensional space, and wherein the two planes are determined to include the characteristic object.

11. A non-transitory computer-readable storage medium storing computer program instructions executable by a processor to perform operations, the operations comprising:
   obtaining an image of a real-world scene with respect to a first viewpoint of a first sensor capturing the scene, wherein the first sensor is a camera;
   obtaining a second set of sensor measurements representing the scene in a three-dimensional space captured by a second sensor, wherein the second sensor is an active sensor which emits sound and/or light;
   identifying a first annotation in the image that indicates a location of a characteristic object in two-dimensional space of the image, wherein the first annotation is a first bounding box about the characteristic object and represents a portion of the image which depicts the characteristic object;
   determining a spatial region in the three-dimensional space that corresponds to the portion of the scene, wherein the spatial region is determined using at least the first viewpoint of the first sensor and a location of the first annotation in the two-dimensional space,
   and wherein the spatial region represents a frustum which extends in the three-dimensional space from a viewpoint of the first sensor through boundaries of the first bounding box, and wherein the frustum represents a subset of the three-dimensional space; and
   annotating the set of sensor measurements within the spatial region to generate a second annotation that identifies a second bounding box associated with a location of the characteristic object in the three-dimensional space, wherein the second bounding box is identified via searching within the subset of three-dimensional space, and wherein searching of the three-dimensional space is constrained to the subset.

12. The computer-readable storage medium of claim 11, wherein the set of sensor measurements are arranged as a point cloud that models the scene with respect to a three-dimensional coordinate system.

13. The computer-readable storage medium of claim 11, wherein the set of sensor measurements are arranged as a depth map, the depth map including depth measurements that indicate distances of objects in the scene from the first sensor.

14. The computer-readable storage medium of claim 11, wherein determining the second annotation comprises:
   applying an annotation model to the filtered subset to determine the second annotation.

15. The computer-readable storage medium of claim 11, the operations further comprising training a computer model using the second annotation in the set of sensor measurements.

16. The computer-readable storage medium of claim 11, wherein the second sensor is a LIDAR sensor.

17. The computer-readable storage medium of claim 11, wherein the set of sensor measurements are captured with respect to a second viewpoint of the second sensor, and wherein the first viewpoint is different from the second viewpoint.

18. The computer-readable storage medium of claim 11, wherein the second bounding box surrounds at least a portion of the characteristic object in the three-dimensional space.

19. A system, comprising:
a computer processor for executing computer program instructions; and
a non-transitory computer-readable storage medium storing computer program instructions executable by the processor to perform operations comprising:
obtaining an image of a real-world scene with respect to a first viewpoint of a first sensor capturing the scene, wherein the first sensor is a camera;
obtaining a second set of sensor measurements representing the scene in a three-dimensional space captured by a second sensor, wherein the second sensor is an active sensor which emits sound and/or light;
identifying a first annotation in the image that indicates a location of a characteristic object in two-dimensional space of the image, wherein the first annotation is a first bounding box about the characteristic object and represents a portion of the image which depicts the characteristic object;
determining a spatial region in the three-dimensional space that corresponds to the portion of the scene, wherein the spatial region is determined using at least the first viewpoint of the first sensor and a location of the first annotation in the two-dimensional space,
and wherein the spatial region represents a frustum which extends in the three-dimensional space from a viewpoint of the first sensor through boundaries of the first bounding box, and wherein the frustum represents a subset of the three-dimensional space; and
annotating the set of sensor measurements within the spatial region to generate a second annotation that identifies a second bounding box associated with a location of the characteristic object in the three-dimensional space, wherein the second bounding box is identified via searching within the subset of three-dimensional space, and wherein searching of the three-dimensional space is constrained to the subset.

20. The system of claim 19, wherein determining the second annotation comprises:
applying an annotation model to the filtered subset to determine the second annotation.

* * * * *